United States Patent
Ashjaee et al.

(10) Patent No.: US 8,872,700 B2
(45) Date of Patent: Oct. 28, 2014

(54) GNSS SURVEYING RECEIVER WITH MULTIPLE RTK ENGINES

(75) Inventors: Javad Ashjaee, Saratoga, CA (US); Lev B. Rapoport, Moscow (RU)

(73) Assignee: Javad GNSS, Inc., San Jose, CA (US)

( * ) Notice: Subject to any disclaimer, the term of this patent is extended or adjusted under 35 U.S.C. 154(b) by 344 days.

(21) Appl. No.: 13/437,366

(22) Filed: Apr. 2, 2012

(65) Prior Publication Data

US 2012/0256788 A1    Oct. 11, 2012

Related U.S. Application Data

(60) Provisional application No. 61/472,571, filed on Apr. 6, 2011.

(51) Int. Cl.
G01S 19/43    (2010.01)
G01S 19/40    (2010.01)

(52) U.S. Cl.
CPC .......... *G01S 19/43* (2013.01); *G01S 19/40* (2013.01)
USPC ................................. 342/357.26; 342/357.23

(58) Field of Classification Search
CPC .......... G01S 19/40; G01S 19/42; G01S 19/44
USPC ............... 342/357.23, 357.24, 357.26, 357.4; 701/469, 470
See application file for complete search history.

(56) References Cited

U.S. PATENT DOCUMENTS

| | | | |
|---|---|---|---|
| 5,610,614 A * | 3/1997 | Talbot et al. | ................. 342/352 |
| 2005/0001762 A1 | 1/2005 | Han et al. | |
| 2007/0057839 A1 | 3/2007 | Kagawa | |
| 2008/0074319 A1 | 3/2008 | Han et al. | |
| 2009/0184869 A1 | 7/2009 | Talbot et al. | |
| 2009/0189804 A1 | 7/2009 | Ashjaee et al. | |
| 2011/0187598 A1 * | 8/2011 | Dai et al. | ...................... 342/451 |

FOREIGN PATENT DOCUMENTS

JP    2005-189042 A    7/2005

OTHER PUBLICATIONS

International Search Report and Written Opinion received for PCT Patent Application No. PCT/US2012/032205, mailed on Dec. 26, 2012, 6 pages.
International Preliminary Report on Patentability received for PCT Patent Application No. PCT/US2012/032205, mailed on Oct. 17, 2013, 5 pages.
Extended European Search Report (includes Supplementary European Search Report and Search Opinion) received for European Patent Application No. 12805269.3, mailed on Jul. 23, 2014, 8 pages.

* cited by examiner

*Primary Examiner* — Dao Phan
(74) *Attorney, Agent, or Firm* — Morrison & Foerster LLP

(57) ABSTRACT

The position of a global navigation satellite system (GNSS) surveying receiver is determined based on a plurality of RTK engines. A first RTK engine is implementing using a first set of parameters. A second RTK engine is implemented using a second set of parameter different than the first set. A plurality of GNSS signals are received from multiple satellites. At least one correction signal is received from at least one base receiver. A first position is determined from the first RTK engine based on the GNSS signals and the at least one correction signal. A second position is determined from the first RTK engine based on the GNSS signals and the at least one correction signal. A final position of the GNSS surveying receiver is determined based on the first position or the second position or a combination of both positions.

27 Claims, 4 Drawing Sheets ial signals comprise carrier harmonic signals that are modulated by pseudo-random binary codes and which, on the receive side, are used to measure the delay relative to a local reference clock. These delay measurements are used to determine the so-called pseudo-ranges between the receiver and the satellites. The pseudo-ranges are different from the true geometric ranges because the receiver's local clock is different from the satellite onboard clocks. If the number of satellites in sight is greater than or equal to four, then the measured pseudo-ranges can be processed to determine the user's single point location as represented by a vector $X=(x,y,z)^T$, as well as to compensate for the receiver clock offset.

GNSS SURVEYING RECEIVER WITH MULTIPLE RTK ENGINES

This application claims the benefit commonly assigned U.S. Provisional Patent Application Ser. No. 61/472,571, titled "GNSS SURVEYING RECEIVER WITH MULTIPLE RTK ENGINES" by Javad Ashjaee, filed on Apr. 6, 2011, and which is incorporated herein in its entirety.

BACKGROUND

1. Field

The present disclosure relates generally to global navigation satellite systems (GNSS), and more specifically to GNSS surveying receivers using multiple real time kinematic (RTK) engines.

2. Description of Related Art

Navigation receivers that use global navigation satellite systems, such as GPS or GLONASS (hereinafter collectively referred to as "GNSS"), enable the highly accurate determination of the position of the receiver. The satellite signals comprise carrier harmonic signals that are modulated by pseudo-random binary codes and which, on the receive side, are used to measure the delay relative to a local reference clock. These delay measurements are used to determine the so-called pseudo-ranges between the receiver and the satellites. The pseudo-ranges are different from the true geometric ranges because the receiver's local clock is different from the satellite onboard clocks. If the number of satellites in sight is greater than or equal to four, then the measured pseudo-ranges can be processed to determine the user's single point location as represented by a vector $X=(x,y,z)^T$, as well as to compensate for the receiver clock offset.

GNSS finds particular application in the field of surveying, which requires highly accurate measurements. The need to improve positioning accuracies has eventually led to the development of differential navigation/positioning. In this mode, the user position is determined relative to the antenna connected to a base receiver or a network of base receivers, assuming that the positional coordinates of the base receiver(s) are known with high accuracy. The base receiver or receiver network transmits its measurements (or corrections to the full measurements) to a mobile navigation receiver (or rover). The rover receiver uses these corrections to refine its own measurements in the course of data processing. The rationale for this approach is that since the pseudo-range measurement errors on the base and rover sides are strongly correlated, using differential measurements will substantially improve positioning accuracy.

Usually, the base is static and located at a known position. However, in relative navigation mode, both the base and rover are moving. In this mode, the user is interested in determining the vector between the base and the rover. In other words, the user is interested in determining the continuously changing rover position relative to the continuously changing position of the base. For example, when one aircraft or space vehicle is approaching another for in-flight refueling or docking, a highly accurate determination of relative position is important, while the absolute position of each vehicle is generally not critical.

The position of the rover changes continuously in time, and thus should be referenced to a time scale. The determination of the position of a mobile rover with respect to a base receiver in real-time may be performed using a "Real-Time Kinematic" or RTK algorithm, which is stored in memory on the rover. As the name "real time kinematic" implies, the rover receiver is capable of calculating/outputting its precise position as soon as raw data measurements and differential corrections are available at the rover (i.e., practically instantly). The RTK mode uses a data communication link (typically either a radio communication link or a GSM binary data communication link), through which all the necessary information is transmitted from the base to the rover.

Further improvement of the accuracy in differential navigation/positioning applications can be achieved by using both the carrier phase and pseudorange measurements from the satellites to which the receivers are locked. Hone measures the carrier phase of the signal received from a satellite in the base receiver and compares it with the carrier phase of the same satellite measured in the rover receiver, one can obtain measurement accuracy to within a small fraction of the carrier's wavelength The accuracy of the differential positioning may also depend on the RTK algorithm. For example, the RTK algorithm may make assumptions about, among other factors, how many GNSS satellites to use or how to handle outlier measurements. If these assumptions are correct, the RTK algorithm may quickly produce an accurate position. If these assumptions are incorrect, the RTK algorithm may produce a less accurate position or may take longer to produce an accurate position.

BRIEF SUMMARY

One exemplary process is for determining the position of a global navigation satellite system (GNSS) surveying receiver based on a plurality of RTK engines. A first RTK engine is implementing using a first set of parameters. A second RTK engine is implemented using a second set of parameter different than the first set. A plurality of GNSS signals are received from multiple satellites. At least one correction signal is received from at least one base receiver. A first position is determined from the first RTK engine based on the GNSS signals and the at least one correction signal. A second position is determined from the first RTK engine based on the GNSS signals and the at least one correction signal. A final position of the GNSS surveying receiver is determined based on the first position or the second position or a combination of both positions.

DETAILED DESCRIPTION

Figure 1:
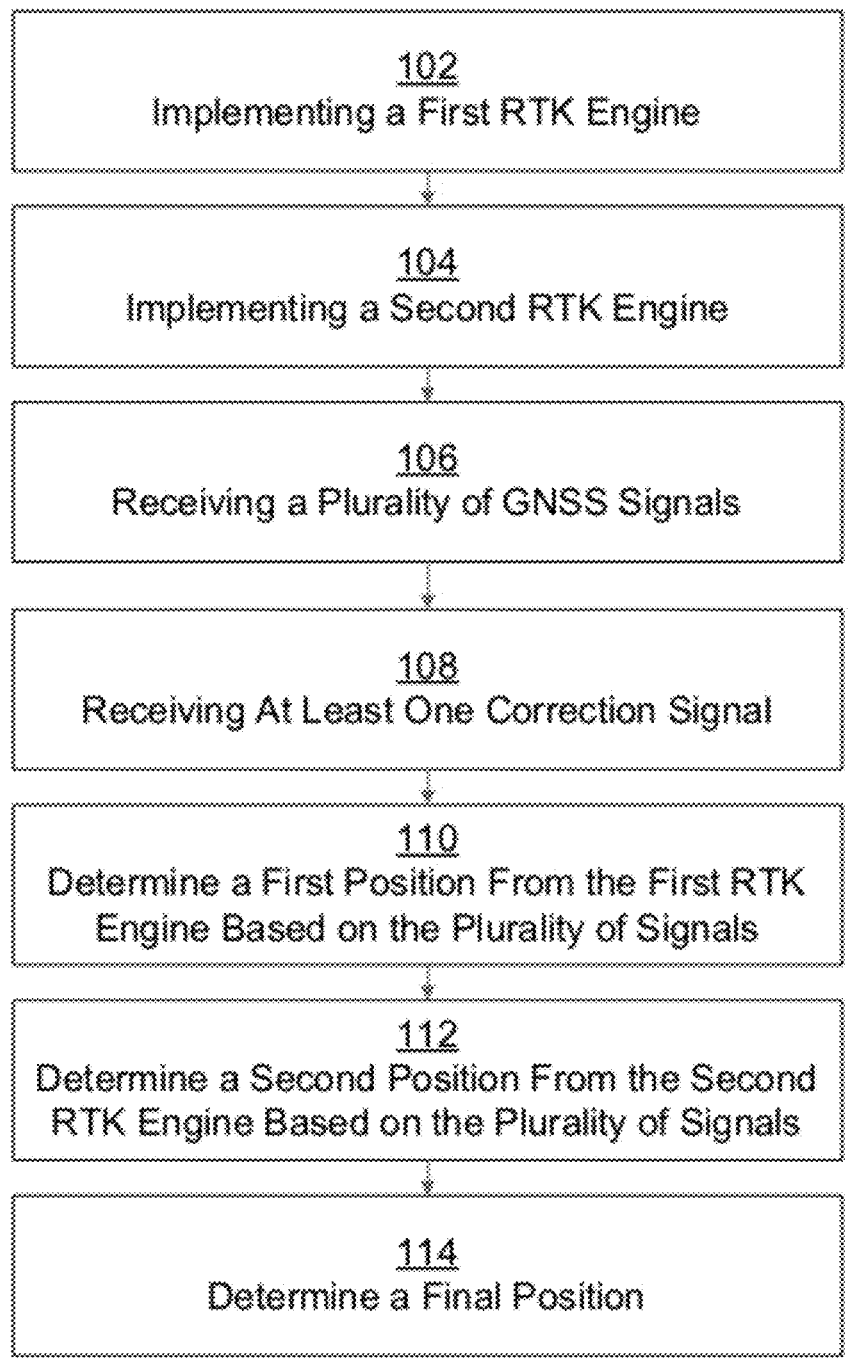
FIG. 1 depicts a flow chart for an exemplary process for using multiple RTK engines on a GNSS device.

The following description is presented to enable a person of ordinary skill in the art to make and use the various embodiments. Descriptions of specific devices, techniques, and applications are provided only as examples. Various modifications to the examples described herein will be readily apparent to those of ordinary skill in the art, and the general principles defined herein may be applied to other examples and applications without departing from the spirit and scope of the various embodiments. Thus, the various embodiments are not intended to be limited to the examples described herein and shown, but are to be accorded the scope consistent with the claims.

FIG. 1 depicts flow chart 100 for an exemplary process for determining a position of a GNSS rover receiver based on position information from a plurality of RTK engines that run in parallel on the GNSS receiver. The exemplary process is suitable for implementation on a GNSS device in the form of computer executable instructions that may be executed on a processor included in the GNSS device.

Figure 2A:
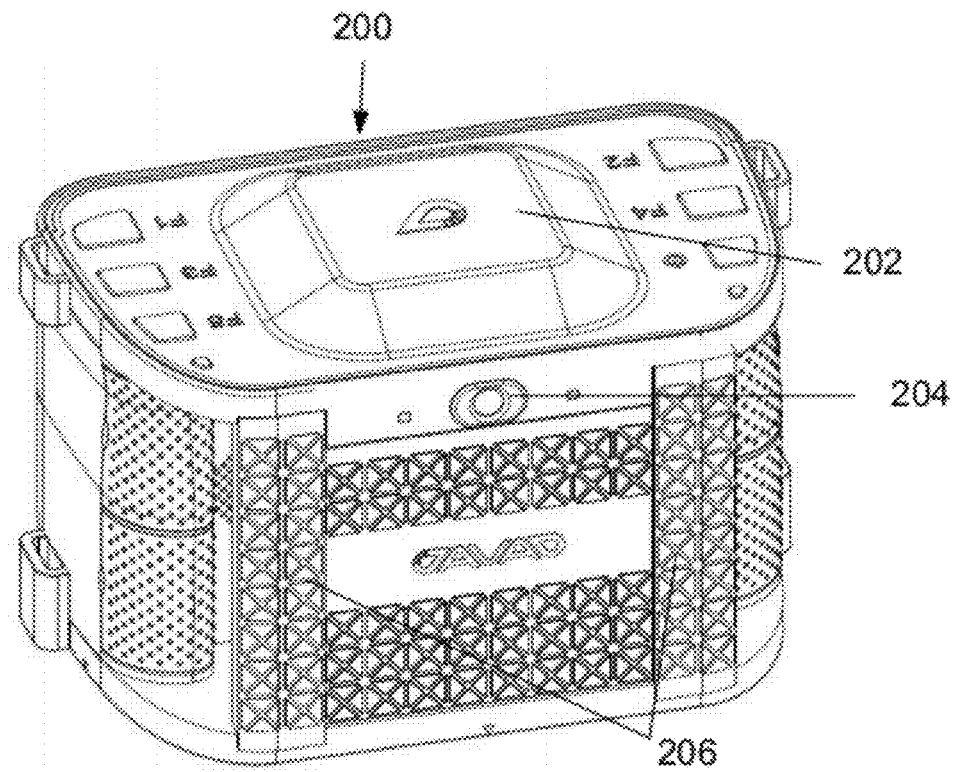
FIG. 2A depicts a view of a GNSS device.
Figure 2B:
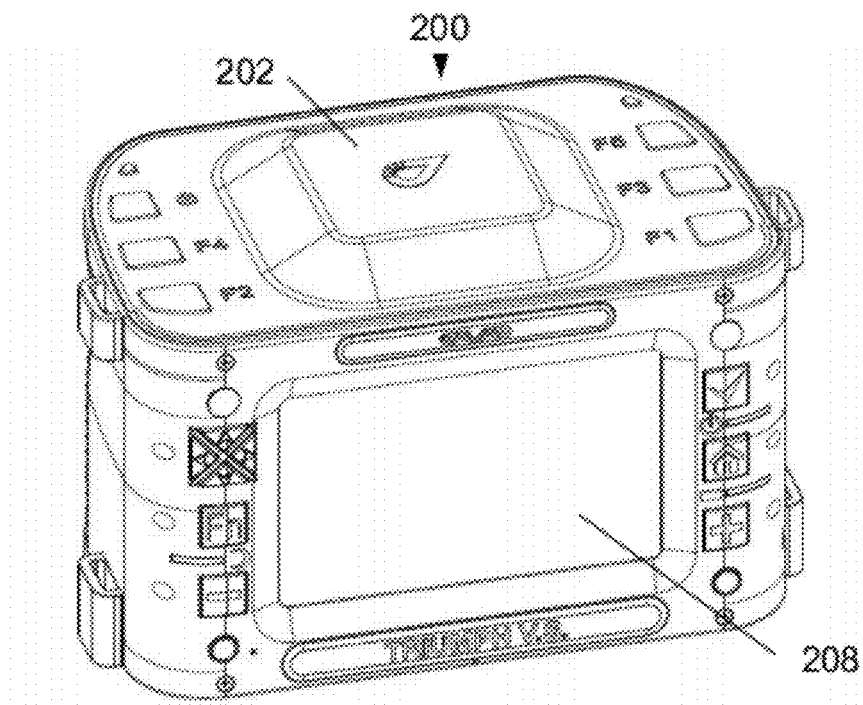
FIG. 2B depicts another view of the GNSS device.

FIG. 2A depicts exemplary GNSS device 200 that may be used to implement the exemplary process. GNSS device 200 includes a GNSS antenna under cover 202, front facing camera 204, and one or more communication antennas under covers 206. FIG. 2B depicts another view of GNSS device 200 showing user interface screen 208. GNSS device 200 also includes one or more processors and memory for storing data and instructions that are executed on the one or more processors.

As used in RTK engine, an "engine" may be defined as an algorithm running on a processor for computing position. Multiple engines may reside on a single processor chip. For example, an engine may run on one core of a multiple-core processor, or multiple threads running multiple algorithms on a single core may each constitute an engine.

Referring back to flow chart 100 of FIG. 1, in operation 102, a GNSS device implements a first RTK engine using a first set of parameters. The GNSS device may implement the first RTK engine by running a software algorithm that implements the first RTK engine with the first set of parameters as input.

The first set of parameters specifies how the RTK engine should operate. In one example, the first set of parameters is loaded from memory that is a part of the GNSS device. In another example, the first set of parameters is obtained from the user through the use of a user interface of the GNSS device. Exemplary parameters that may be included in the first set of parameters include parameters specifying: the number of satellites to consider in determining a position of the GNSS device, a fading factor, residual ionosphere estimator parameters, how outlier detection should be handled, and the tolerances of the integer ambiguity validation procedure.

A parameter specifying the number of satellites to consider may be used, for example, to limit the RTK engine to using signals from five GPS satellites and three GLONASS satellites that have the strongest signals. In other examples, satellites from other GNSS constellations may also be used. In another example, this parameter may specify that all available satellites should be used. In yet another example, this parameter may specify that only satellites without multipath error should be used. In this example, the chance of multipath error for a satellite may be estimated based upon the correlation between multipath error and elevation of the satellite with respect to the horizon. By limiting the number of satellites, the RTK engine may provide a position faster than an RTK engine using all available satellites.

The RTK engine may employ a recursive algorithm for determining position. In one case, the RTK engine may employ a parameter specifying the fading factor, which determines the weight to be applied to previous data collected by the RTK engine when updating the position determination. A longer fading factor may provide more stability to the RTK engine. However, a shorter fading factor may provide faster and more accurate results under changing environmental conditions that may affect signal reception at the GNSS device.

The residual ionospheric delay estimator is used to account for the delay in a signal resulting from the signal traveling through the ionosphere. Several parameters control its operation (e.g., expected residual ionospheric delay and expected time of auto-correlation).

One or more parameters may specify how outlier detection is handled. In a case where the atmospheric channel is assumed to be bandlimited white noise with a defined variance, then parameters can be defined that specify how aggressive the RTK engine should be in dropping anomalous measurements that violate this error assumption. For example, a parameter may specify a threshold on the probability of an anomalous measurement. If the measurement has a probability of less than a threshold (e.g., $10^{-7}$ or $10^{-10}$), the RTK engine may handle the measurement as an anomalous measurement and may, for example, drop the measurement. In another example, a threshold may be placed on the error associated with a measurement.

An RTK engine may produce either an RTK Fixed position or an RTK Float position. Whether an RTK Fixed position is obtained may depend, in part, on the integer ambiguity validation procedure. The RTK engine may accept one or more parameters that affect the tolerances of the integer ambiguity validation procedure.

While exemplary parameters have been described, other parameters may also be used.

In operation 104, a GNSS device implements a second RTK engine using a second set of parameters. This operation may proceed in the same manner as operation 102. The second set of parameters is different from the first set of parameters. For example, the second set of parameters may have different values for one or more parameters as compared to the first set of parameters or the second set of parameters may have one or more different parameters as compared to the first set of parameters.

In one example, the first and second RTK engines may be implemented on the same processor of the GNSS device. In another example, if the GNSS device contains multiple processors, the first and second RTK engines may be implemented on different processors.

The second RTK engine may be identical to the first RTK engine. In this case, any differences in the position produced by the two RTK engines may be caused by differences in the first and second sets of parameters.

Alternatively, the second RTK engine may be different from the first RTK engine. For example, the second RTK engine may be implemented with a different algorithm as compared to the first RTK engine. In this case, any difference in the position produced by the two RTK engines may be caused by differences in the first and second sets of parameters or by differences in the RTK algorithms.

In operation 106, the GNSS device receives a plurality of GNSS signals from multiple GNSS satellites. The GNSS signals contain timing information that may be used by each RTK engine running on the GNSS device to determine its position. The GNSS signals may be received through, for example, a GNSS antenna mounted on the GNSS device and connected to a GNSS receiver.

In operation 108, the GNSS device receives a correction signal from at least one base station or network of base stations. The correction signal contains correction information that may be used by each RTK engine to improve the accuracy of the position as determined by using the GNSS signals from operation 106. The correction signal may be received through, for example, a communications antenna mounted on the GNSS device and connected to a communications receiver or transceiver in the GNSS device.

In operation 110, the GNSS device determines a first position from the first RTK engine based on the plurality of GNSS signals and the at least one correction signal. The first RTK engine may also provide a first error indicator of the first position. For example, the first RTK engine may provide an RMS error. As another example, the first RTK engine may also provide the type of solution or position it determined. In this example, an RTK Float position may have a higher error associated with it as compared to a RTK Fixed position.

In operation 112, the GNSS device determines a second position from the second RTK engine based on the plurality of GNSS signals. Like the first RTK engine, the second RTK engine may also provide a second error indicator of the second position.

A more detailed description of determining a position based on signals from GNSS satellites and base stations is available in U.S. patent application Ser. No. 12/070,333, filed Feb. 15, 2008, published as U.S. Patent Publication No. 2008/0208454 and Ser. No. 12/360,808, filed Jan. 27, 2009, published as U.S. Patent Publication No. 2009/0189804 assigned to the assignee of the present invention, and each of which are incorporated herein by reference in their entirety for all purposes.

In operation 114, the GNSS device determines a final position based on the results from operations 110 and 112. For example, if the first position and the second positions are the same, then the final position may be the first and second positions. Even if the first and second positions are identical, the differences between the first and second sets of parameters or the differences between the first and second RTK engines may result in the first or second RTK engine producing a resulting position before the other RTK engine produces a position. The final position may be selected as the RTK position that is available first.

In another example, the first and second positions may be different. Any difference may be due to the differences between the first and second sets of parameters. In an alternative example, if the first and second RTK engines are different, this may also account for the differences in positions. In these examples, any number of possible methods may be used to determine the final position. Both the first and second positions may be averaged together to determine the final position. The first and second error indications may also be used to determine which of the first and second positions to use as the final position (e.g., the position with the smallest error is used as the final position). The error indications could also be used to determine weights for a weighted averaging of the first and second positions. If either of the positions is an RTK Fixed position while the other position is an RTK Float position, the RTK Fixed position may be used because, in many cases, an RTK Fixed position is always more accurate than an RTK Float position. These are just a few possible methods for determining the final position based on the first or second position. Other methods also exist that do not deviate from the exemplary process.

Figure 3A:
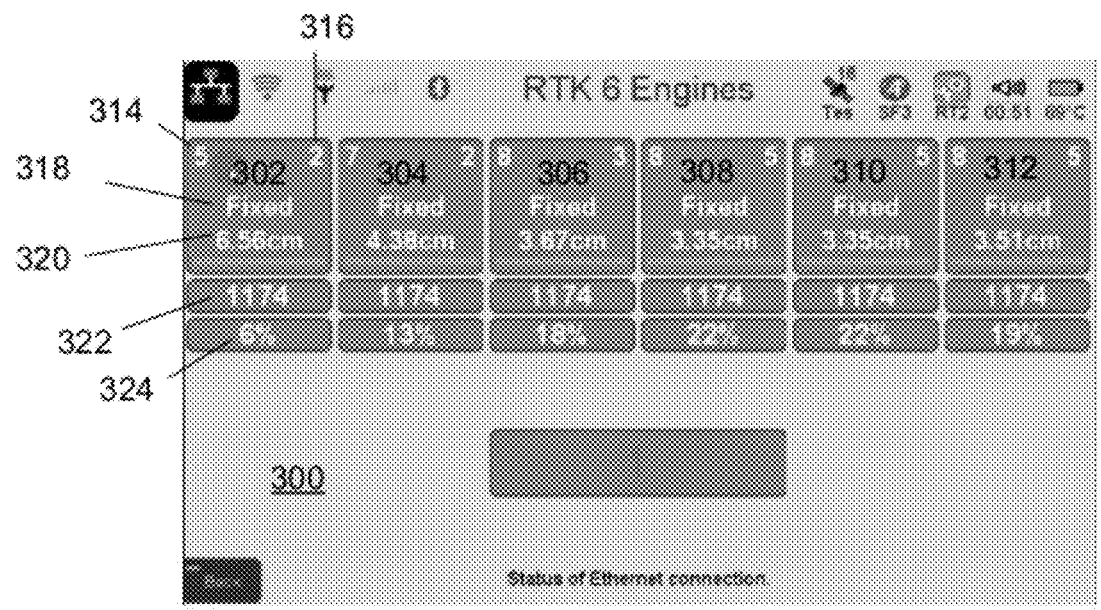
FIG. 3A depicts a screenshot of a user interface screen of a GNSS device.

The exemplary process has been described with respect to two RTK engines. However, any number of engines may be used. For example, FIG. 3A depicts user interface screen 300 of a GNSS device with six RTK engines (a "six pack") represented by status windows 302, 304, 306, 308, 310, and 312. Status window 302 has field 314 showing the number of GPS satellites being used, field 316 showing the number of GLONASS satellites being used, field 318 showing whether the solution is a RTK Fixed or RTK Float solution, field 320 showing the RMS of the position determined by the RTK engine, field 322 showing the time in seconds since the RTK engine was last reset, and field 324 showing the weight of the position from the RTK engine in determining the final position.

Figure 3B:
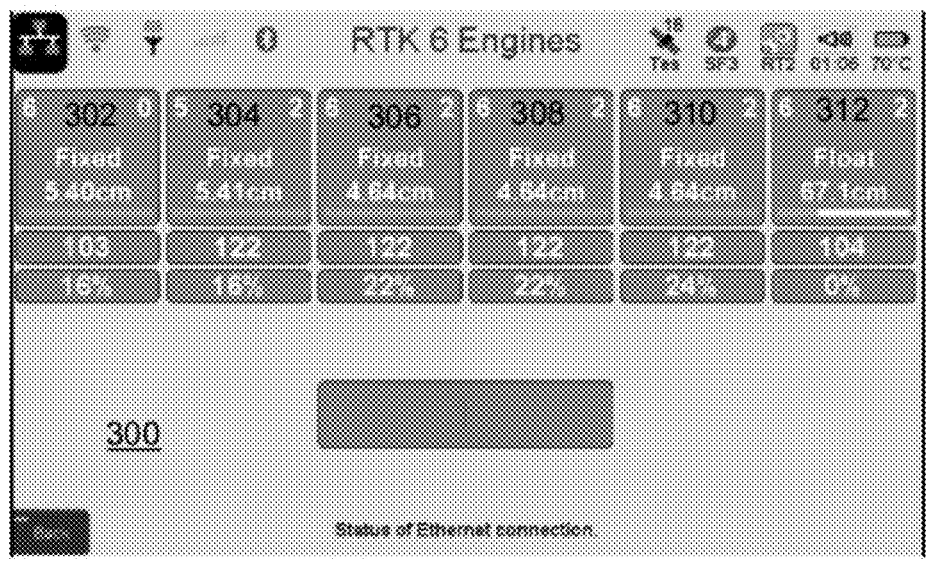
FIG. 3B depicts another screenshot of the user interface screen of the GNSS device.

FIG. 3B again depicts user interface screen 300 of the GNSS device with the same six RTK engines running. However, now the solutions determined by each RTK engine have decreased in accuracy due to a change in the ability of the GNSS signals to reach the GNSS device, e.g., an obstacle interposed between the GNSS receiver and one or more satellites. In this case, the RTK engine represented by status window 312 is producing an RTK Float solution and is not being used at all for the final solution.

While the invention has been described in terms of a particular exemplary process and illustrative figures, those of ordinary skill in the art will recognize that the invention is not limited to the process or figures described. Those skilled in the art will recognize that the operations of the exemplary process may be implemented using hardware, software, firmware, or combinations thereof, as appropriate. For example, some processes can be carried out using processors or other digital circuitry under the control of software, firmware, or hard-wired logic. (The term "logic" herein refers to fixed hardware, programmable logic and/or an appropriate combination thereof, as would be recognized by one skilled in the art to carry out the recited functions.) Software and firmware can be stored on computer-readable media. Some other processes can be implemented using analog circuitry, as is well known to one of ordinary skill in the art. Additionally, memory or other storage, as well as communication components, may be employed in embodiments of the invention.

Figure 4:
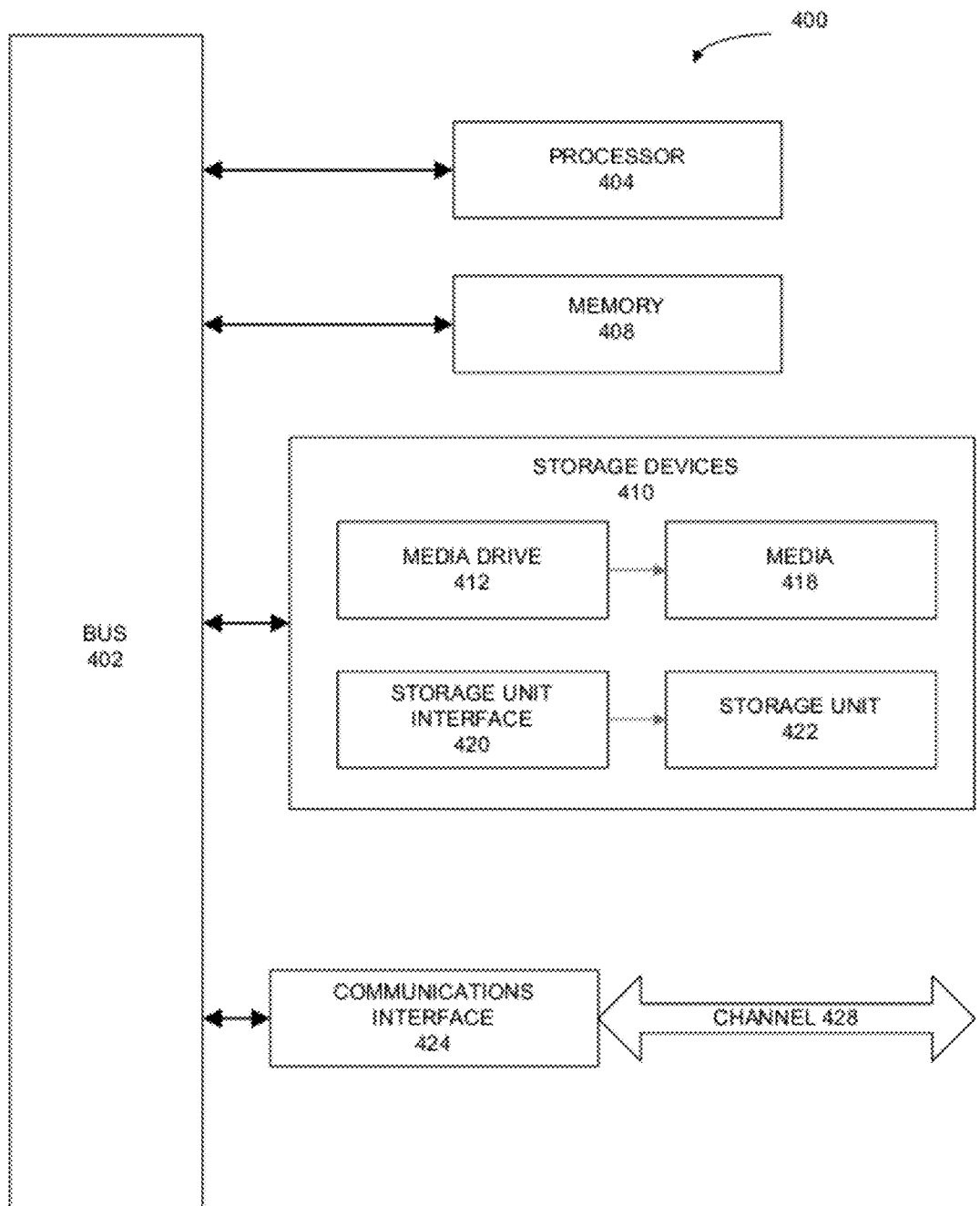
FIG. 4 depicts a typical computer system.

FIG. 4 illustrates a typical computing system 400 that may be employed to implement processing functionality in exemplary process of the invention. Computing systems of this type may be used to implement the rover processing logic and the base processing logic, for example. Those skilled in the relevant art will also recognize how to implement the invention using other computer systems or architectures. Computing system 400 may represent, for example, a desktop, laptop or notebook computer, hand-held computing device (PDA, cell phone, palmtop, etc.), mainframe, server, client, or any other type of special or general purpose computing device as may be desirable or appropriate for a given application or environment. Computing system 400 can include one or more processors, such as a processor 404. Processor 404 can be implemented using a general or special purpose processing engine such as, for example, a microprocessor, microcontroller or other control logic. In this example, processor 404 is connected to a bus 402 or other communication medium.

Computing system 400 may also include a main memory 408, such as random access memory (RAM) or other dynamic memory, for storing information and instructions to be executed by processor 404. Main memory 408 also may be used for storing temporary variables or other intermediate information during execution of instructions to be executed by processor 404. Computing system 400 may likewise include a read only memory ("ROM") or other static storage device coupled to bus 402 for storing static information and instructions for processor 404.

The computing system 400 may also include information storage system 410, which may include, for example, a media drive 412 and a removable storage interface 420. The media drive 412 may include a drive or other mechanism to support fixed or removable storage media, such as a hard disk drive, a floppy disk drive, a magnetic tape drive, an optical disk drive, a CD or DVD drive (R or RW), or other removable or fixed media drive. Storage media 418, may include, for example, a hard disk, floppy disk, magnetic tape, optical disk, CD or DVD, or other fixed or removable medium that is read by and written to by media drive 414. As these examples illustrate, the storage media 418 may include a computer-readable storage medium having stored therein particular computer software or data.

In alternative embodiments, information storage system 410 may include other similar components for allowing computer programs or other instructions or data to be loaded into computing system 400. Such components may include, for example, a removable storage unit 422 and an interface 420, such as a program cartridge and cartridge interface, a removable memory (for example, a flash memory or other removable memory module) and memory slot, and other removable storage units 422 and interfaces 420 that allow software and data to be transferred from the removable storage unit 418 to computing system 400.

Computing system 400 can also include a communications interface 424. Communications interface 424 can be used to allow software and data to be transferred between computing system 400 and external devices. Examples of communications interface 424 can include a modem, a network interface (such as an Ethernet or other NIC card), a communications port (such as for example, a USB port), a PCMCIA slot and card, etc. Software and data transferred via communications interface 424 are in the form of signals which can be electronic, electromagnetic, optical or other signals capable of being received by communications interface 424. These signals are provided to communications interface 424 via a channel 428. This channel 428 may carry signals and may be implemented using a wireless medium, wire or cable, fiber optics, or other communications medium. Some examples of a channel include a phone line, a cellular phone link, an RF link, a network interface, a local or wide area network, and other communications channels.

In this document, the terms "computer program product," "computer-readable storage medium" and the like may be used generally to refer to media such as, for example, memory 408, storage device 418, or storage unit 422. These and other forms of computer-readable media may be involved in storing one or more instructions for use by processor 404, to cause the processor to perform specified operations. Such instructions, generally referred to as, e.g., "computer program code" (which may be grouped in the form of computer programs or other groupings), when executed, enable the computing system 400 to perform features or functions of embodiments of the present invention. Note that the code may directly cause the processor to perform specified operations, be compiled to do so, and/or be combined with other software, hardware, and/or firmware elements (e.g., libraries for performing standard functions) to do so.

In an embodiment where the elements are implemented using software, the software may be stored in a computer-readable medium and loaded into computing system 400 using, for example, removable storage drive 414, drive 412 or communications interface 424. The control logic (in this example, software instructions or computer program code), when executed by the processor 404, causes the processor 404 to perform the functions of the invention as described herein.

It will be appreciated that, for clarity purposes, the above description has described embodiments of the invention with reference to different functional units and processors. However, it will be apparent that any suitable distribution of functionality between different functional units, processors or domains may be used without detracting from the invention. For example, functionality illustrated to be performed by separate processors or controllers may be performed by the same processor or controller. Hence, references to specific functional units are only to be seen as references to suitable means for providing the described functionality, rather than indicative of a strict logical or physical structure or organization.

Although individually listed, a plurality of means, elements or operations may be implemented by, for example, a single unit or processor. Additionally, although individual features may be included in different claims, these may possibly be advantageously combined, and the inclusion in different claims does not imply that a combination of features is not feasible and/or advantageous. Also, the inclusion of a feature in one category of claims does not imply a limitation to this category, but rather the feature may be equally applicable to other claim categories, as appropriate.

Moreover, it will be appreciated that various modifications and alterations may be made by those skilled in the art without departing from the spirit and scope of the invention. The invention is not to be limited by the foregoing illustrative details, but is to be defined according to the claims.

What is claimed is:

1. A computer implemented method for determining a position of a global navigation satellite system (GNSS) surveying receiver based on a plurality of RTK engines, the method comprising:
   implementing a first RTK engine of the plurality of RTK engines using a first set of parameters;
   implementing a second RTK engine of the plurality of RTK engines using a second set of parameters different from the first set of parameters;
   receiving a plurality of GNSS signals from multiple satellites;
   receiving at least one correction signal from at least one base receiver;
   determining a first position of the GNSS receiver from the first RTK engine based on the plurality of GNSS signals and the at least one correction signal;
   determining a second position of the GNSS surveying receiver from the second RTK engine based on the plurality of GNSS signals and the at least one correction signal; and
   determining a final position of the GNSS surveying receiver based on the first position or the second position or a combination of both.

2. The method of claim 1, wherein the final position is a weighted average of the first and second positions.

3. The method of claim 1, wherein the final position is also based on a first error indication and a second error indication for the first and second positions, respectively.

4. The method of claim 1, wherein the first and second RTK engines implement the same algorithm.

5. The method of claim 1, wherein the first set of parameters includes a parameter specifying a maximum number of satellites to use in determining position.

6. The method of claim 1, wherein the first set of parameters includes a fading factor.

7. The method of claim 1, wherein the first set of parameters includes a residual ionospheric delay estimator.

8. The method of claim 1, wherein the first set of parameters includes a parameter used to determine whether to handle a measurement as an anomalous measurement.

9. The method of claim 1, wherein an integer ambiguity validation procedure used by the first RTK engine is based on a parameter in the first set of parameters.

10. A nontransitory computer-readable storage medium storing computer-readable instructions for determining a position of a global navigation satellite system (GNSS) surveying receiver based on a plurality of RTK engines, the instructions for:

implementing a first RTK engine of the plurality of RTK engines using a first set of parameters;

implementing a second RTK engine of the plurality of RTK engines using a second set of parameters different from the first set of parameters;

receiving a plurality of GNSS signals from multiple satellites;

receiving at least one correction signal from at least one base receiver;

determining a first position of the GNSS surveying receiver from the first RTK engine based on the plurality of GNSS signals and the at least one correction signal;

determining a second position of the GNSS surveying receiver from the second RTK engine based on the plurality of GNSS signals and the at least one correction signal; and determining a final position of the GNSS surveying receiver based on the first position or the second position or a combination of both.

11. The computer-readable medium of claim 10, wherein the final position is a weighted average of the first and second positions.

12. The computer-readable medium of claim 10, wherein the final position is also based on a first error indication and a second error indication for the first and second positions, respectively.

13. The computer-readable medium of claim 10, wherein the first and second RTK engines implement the same algorithm.

14. The computer-readable medium of claim 10, wherein the first set of parameters includes a parameter specifying a maximum number of satellites to use in determining position.

15. The computer-readable medium of claim 10, wherein the first set of parameters includes a fading factor.

16. The computer-readable medium of claim 10, wherein the first set of parameters includes a residual ionospheric delay estimator.

17. The computer-readable medium of claim 10, wherein the first set of parameters includes a parameter used to determine whether to handle a measurement as an anomalous measurement.

18. The computer-readable medium of claim 10, wherein an integer ambiguity validation procedure used by the first RTK engine is based on a parameter in the first set of parameters.

19. A global navigation satellite system (GNSS) surveying receiver utilizing a plurality of RTK engines, the GNSS surveying receiver comprising:

memory comprising computer-readable instructions for:

implementing a first RTK engine of the plurality of RTK engines using a first set of parameters;

implementing a second RTK engine of the plurality of RTK engines using a second set of parameters different from the first set of parameters;

receiving a plurality of GNSS signals from multiple satellites;

receiving at least one correction signal from at least one base receiver;

determining a first position of the GNSS surveying receiver from the first RTK engine based on the plurality of GNSS signals and the at least one correction signal;

determining a second position of the GNSS surveying receiver from the second RTK engine based on the plurality of GNSS signals and the at least one correction signal; and determining a final position of the GNSS surveying receiver based on the first position or the second position or a combination of both; and a processor for executing the instructions.

20. The GNSS surveying receiver of claim 19, wherein the final position is a weighted average of the first and second positions.

21. The GNSS surveying receiver of claim 19, wherein the final position is also based on a first error indication and a second error indication for the first and second positions, respectively.

22. The GNSS surveying receiver of claim 19, wherein the first and second RTK engines implement the same algorithm.

23. The GNSS surveying receiver of claim 19, wherein the first set of parameters includes a parameter specifying a maximum number of satellites to use in determining position.

24. The GNSS surveying receiver of claim 19, wherein the first set of parameters includes a fading factor.

25. The GNSS surveying receiver of claim 19, wherein the first set of parameters includes a residual ionospheric delay estimator.

26. The GNSS surveying receiver of claim 19, wherein the first set of parameters includes a parameter used to determine whether to handle a measurement as an anomalous measurement.

27. The GNSS surveying receiver of claim 19, wherein an integer ambiguity validation procedure used by the first RTK engine is based on a parameter in the first set of parameters.

\* \* \* \* \*